(12) United States Patent
Onallah

(10) Patent No.: US 10,311,516 B2
(45) Date of Patent: Jun. 4, 2019

(54) TRANSACTION PROCESSING SYSTEM PERFORMANCE EVALUATION

(71) Applicant: Chicago Mercantile Exchange Inc., Chicago, IL (US)

(72) Inventor: Amir Onallah, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 794 days.

(21) Appl. No.: 14/735,500

(22) Filed: Jun. 10, 2015

(65) Prior Publication Data

US 2016/0364797 A1    Dec. 15, 2016

(51) Int. Cl.
*G06Q 40/04* (2012.01)

(52) U.S. Cl.
CPC .................... *G06Q 40/04* (2013.01)

(58) Field of Classification Search
CPC ...................................... G06Q 40/04
USPC ........................................... 705/37
See application file for complete search history.

(56) References Cited

U.S. PATENT DOCUMENTS 7,769,679 B2    8/2010 Skuriat et al.
9,122,789 B1*   9/2015 Massa ................. G06F 11/3612
2007/0094281 A1  4/2007 Malloy et al.
2012/0311387 A1* 12/2012 Santhosh ............ G06F 11/3414
                                                    714/33
2014/0149271 A1  5/2014 West
2014/0195431 A1  7/2014 Lakkapragada et al.

FOREIGN PATENT DOCUMENTS

JP          5266818 B2    8/2013

OTHER PUBLICATIONS

Wikipedia, Data Compression, Captured on Feb. 8, 2005 by Internet Archive WayBack Machine. (Year: 2005).*
International Search Report and Written Opinion, from PCT/US2016/035688, dated Sep. 1, 2016, WO.

* cited by examiner

*Primary Examiner* — Cho Kwong
(74) *Attorney, Agent, or Firm* — Lempia Summerfield Katz LLC

(57) ABSTRACT

A transaction evaluation system may include a configurable and/or scalable transaction rate input model which models historical and/or recent transaction input rate patterns of a transaction processing system for a specified time period with configurable and/or scalable transactional amplitude for use in evaluating performance of the transaction processing system. The system may operate to inject particular volumes of transactions into the transaction processing system at specific times and/or periods of time.

21 Claims, 5 Drawing Sheets

TRANSACTION PROCESSING SYSTEM PERFORMANCE EVALUATION

BACKGROUND

A financial instrument trading system, such as a futures exchange, referred to herein also as an "Exchange", such as the Chicago Mercantile Exchange Inc. ("CME"), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House. A clearing house may also analyze a market and/or open positions of traders to assess a risk of traders' current positions. The analysis may involve an application of a margin model to quantify the risk of positions held by a trader. Performance bonds may be required from traders to balance this determined risk.

Current financial instrument trading systems allow traders to submit orders and receive confirmations, market data, and other information electronically via a network. These "electronic" marketplaces are transaction processing systems that provide an alternative to pit or open outcry based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Traders submit electronic messages, i.e. transactions, that include data elements containing market information and actions such as requested offers to buy or sell a product using the electronic marketplaces. The electronic marketplaces then receive and process these messages/transactions to facilitate the operation of the marketplace. During heavy trading periods of an electronic exchange, thousands of such messages may be received and processed by the hardware and/or software of the electronic marketplace system. For example, on Oct. 15, 2014 an electronic marketplace received 33 million electronic messages in a 30 minute period, with 15 million of these being received in the first 10 minutes of that trading period. This volume of activity can overload/overwhelm, or otherwise cause errors or failure in, an electronic marketplace system. As such, verifying performance of an electronic market system under severe processing loads is very important to maintaining the integrity and functionality of the system. Further, verification of performance using data that mirrors recent actual data of the system is important to accurately evaluate the performance of the multitude of interrelated sub-systems of the electronic marketplace, each of which may have been recently adjusted or modified through system maintenance or improvements for the particularly tailored data that is being received and processed. For example, a transaction processing system, such as an exchange match engine, must continually adapt to increasing electronic order volumes. Maintaining a robust match engine requires routine testing of the engine for readiness to handle real-world trade volumes and data types. Current load testing systems re-play the trading activity load from the previous week to identify errors and ensure readiness for the next week. Some weeks have light trading loads, while others are heavy.

Accordingly, there is a need for a system and method that can effectively verify and/or evaluate the performance of a transaction processing system under heavy loads of actual production data.

DETAILED DESCRIPTION

Figure 1A:
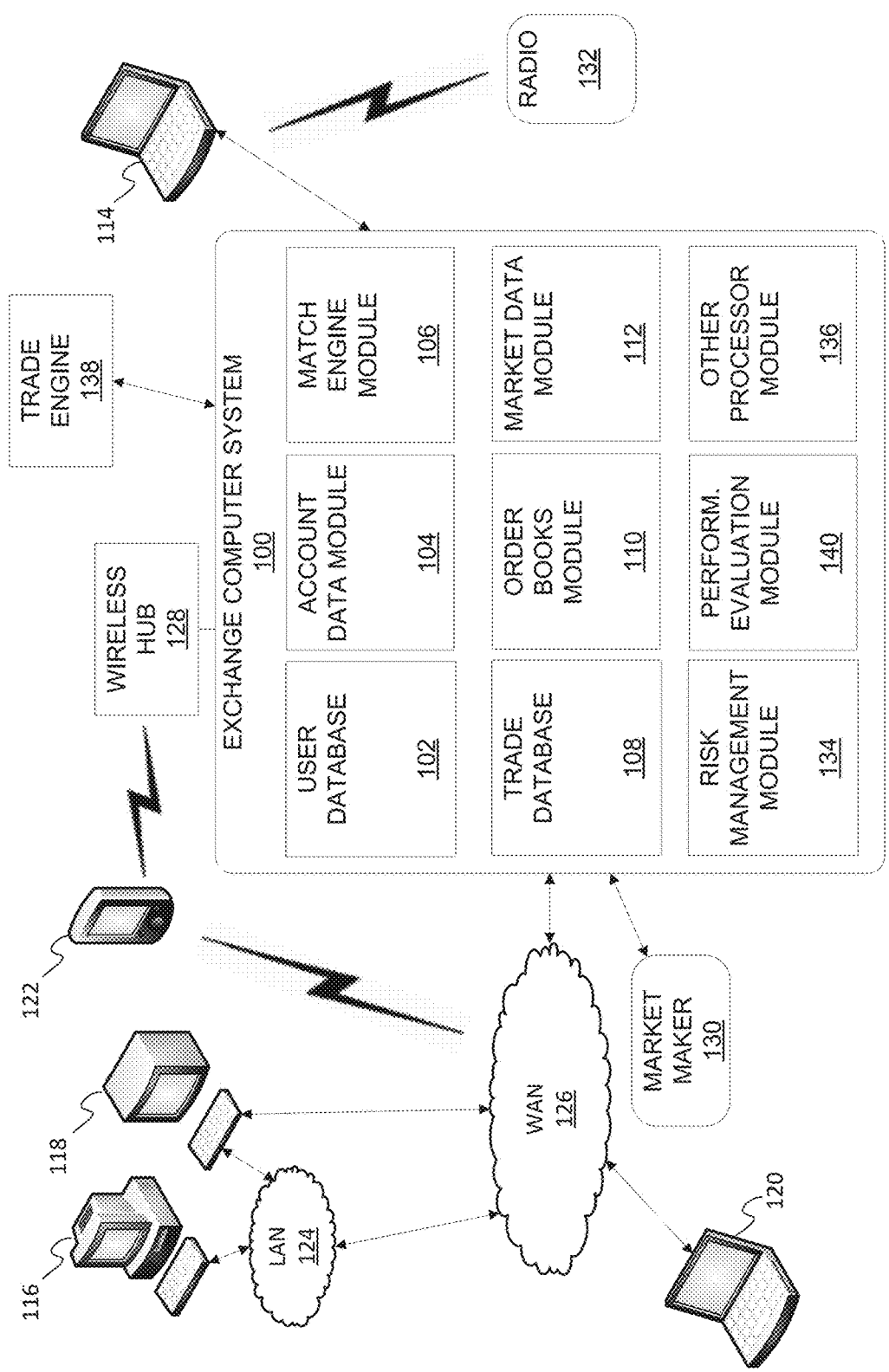
FIGS. 1A-B depict a system for transaction processing system evaluation.

The disclosed embodiments relate to evaluating transaction processing systems. The transaction processing systems may be evaluated through a configurable and/or scalable transaction rate input model which models historical transaction input rate patterns of a transaction processing system for a specified time period with configurable and/or scalable transactional amplitude for use in evaluating performance of the transaction processing system. The model can be implemented as an evaluation system which determines the input rate patterns from historical data transacted during a prior production period of the transaction processing system. The evaluation system may then organize the production data so as to input and/or otherwise provide the production data at rates mirroring the modeled pattern at various factors of transaction per time amplitude to meet and/or exceed established verification amplitude loading standards. As will be described, the simulation of increased loads may be accomplished without having to simulate or otherwise create/fabricate transactions, i.e. by using actual historical transactions, in order to supply the desired transactional volume.

The modeled pattern may be analyzed for various load values such as peak transaction rate amplitudes and average transaction rate amplitudes over a production period or sub-periods. These peak and/or average amplitudes may be amplified by a multiplier to reach desired and/or established verification amplitude standards to establish a desired number of data elements and/or transactions received by a transaction processing system over a length of time. Further, the multiplier modified transaction rate amplitudes may also be subjected to multiples, e.g. 1×, 2×, and/or 3×, of the modified transaction rate amplitudes.

A performance verification system may also be configured to organize the production data elements and/or transactions in a manner such that the production data elements are provided to the transaction processing system with transaction rates having modified transaction rate amplitudes, as well as multiples thereof. This injection of data elements into the transaction processing system may be accomplished through a selection of production data elements large enough to account for the volume of data elements to be injected into the transaction processing system over a verification period. By selectively compressing a given volume of historical transactions, a historical transaction rate pattern may be modeled, exactly or in multiples to simulate increased loads. In particular, the number data elements used for the verification may be larger than the number of data elements of the originally modeled pattern. The additional data elements will be injected sequentially to provide data elements for the larger amplitudes of the verification periods. As such, the data elements/transactions will follow the logical process and results of actual production periods, though at an accelerated volume and/or rate of processing.

Basing system evaluation on a applied and/or specified transaction rate, or number of provided transactions, can better simulate amplified loading conditions for the system in a more closely controlled manner than merely time condensing a set amount of data and providing it to the system (i.e. 30 minutes of production data communicated to the system in 10 minutes, with no consideration of transaction frequency or numbers of data elements provided is a time condensation method of evaluation). Pushing into logical buckets a specific required number of transactions to communicate to the system per second, or other time period, provides for more control over the testing volume amplitudes, as well as provides for better repeatability on system evaluations over time.

As disclosed herein, the evaluation logic is based on transactions or data elements provided. For example, 50 million records, or data elements, may be extracted from a sequential collection of production data elements. These 50 million records may have been received over any time period, but will provide the supply of data elements required for incremental load evaluation of the transaction processing system. As controlled by an injecting system, "Z" number of data elements may be communicated to the transaction processing system in "Y" seconds while maintaining the pattern of the peaks and valleys of the original production data. Subsequently, incremental evaluation datasets are prepared as two and/or three times "Z" in "Y" seconds, thus providing data for subsequent and/or sequential incremental load evaluation. The initially selected larger production data set can provide a supply of records to supply the larger evaluation volumes. In an embodiment, "Z" and "Y" may be selected to match a historical high-water loading, such as 15 million received records in 10 minutes, or an average of 25,000 transactions per second, across a period. In another embodiment, "Z" and "Y" may be selected to match a historical peak loading, such as 82,000 transactions per second, over a more condensed timeframe. The large supply of initially selected records may then provide a supply of records to selectively pad and/or match volumes required to match 1×, 2×, or 3× the high-water loading and/or the historical peaks.

In accordance with aspects of the disclosure, systems and methods are disclosed for transaction system evaluation, and in particular, evaluation of a data transaction processing system in which data items are transacted by a hardware matching processor that matches electronic data transaction request messages for the same one of the data items based on multiple transaction parameters from different client computers over a data communication network as described below. The disclosed embodiments generally create a set of synthetic electronic data transaction requests based on historical data transaction requests, as described herein, which are then provided or otherwise injected in to the data transaction processing system to be transacted thereby, the results thereof being subsequently evaluated to determine the performance the data transaction processing system. The disclosed embodiments are preferably implemented with computer devices and computer networks, such as those described with respect to FIG. 4, that allow users, e.g. market participants, as well as electronic marketplaces, and parties related to the execution thereof, to exchange information. It will be appreciated that the plurality of entities and/or systems utilizing the disclosed embodiments, e.g. the market participants, may be referred to by other nomenclature reflecting the role that the particular entity or system is performing with respect to the disclosed embodiments and that a given entity or system may perform more than one role depending upon the implementation and the nature of the particular transaction or evaluation being undertaken, as well as the entity's contractual and/or legal relationship with another market participant and/or the exchange.

While the disclosed embodiments will be discussed with respect to evaluating performance of an electronic trading system, e.g. a data transaction processing system in which data items are transacted by a hardware matching processor that matches electronic data transaction request messages for the same one of the data items based on multiple transaction parameters from different client computers over a data communication network, it will be appreciated that the disclosed embodiments are applicable to evaluating performance of any transaction processing system which receives and/or processes an ad hoc, irregular, varying or otherwise aperiodic volume or rate of transactions, including point of sale systems, payment processing systems, data collection systems, etc.

An exemplary trading network environment for implementing transaction processing system evaluation is shown in FIG. 1A. A transaction processing system, such as an exchange computer system 100, receives orders and transmits market data related to orders and trades to users, such as via wide area network 126 and/or local area network 124 and computer devices 114, 116, 118, 120 and 122, as will be described below, coupled with the exchange computer system 100. Also, the exchange computer system 100 may include a transaction processing system evaluation module 140 that operates to evaluate the performance exchange computer system 100, particularly the operation of the modules contained therein through the sequential processing of previously received data elements and/or trader transactions. Further, the exchange computer system 100 may be operable to facilitate messaging or other communication between a market maker 130 and/or the computer devices 114, 116, 118, 120 and 122 via wide area network 126 and/or local area network 124, particularly as it relates to information relating to the transaction processing system evaluation module 140.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names, passwords, a preferred contact method, and contact information for the preferred contact method. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to pre-process received electronic messages including orders, for example to decompose delta based and/or bulk order types for processing by the order book module 110 and/or match engine module 106. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100. As indicated herein, the system evaluation module 140 may provide data elements to the exchange computer system 100 such that any and/or all of the modules are engages and function to process the data elements, as is indicated for the production environment of the exchange computer system.

In an embodiment, the evaluation module 140 may be configured to identify a contiguous set of data elements previously processed by the exchange computer system 100. The set of data elements having been received by the exchange computer system 100 in an order, and processed through the various modules of the exchange computer system 100 to match trades, produce market data, and other exchange computer system 100 functions. The data evaluation module 140 may also be configured to section a subset of the set of data elements into portions, the subset having been received by the exchange computer system 100 over a length of time. The evaluation module 140 may also be configured to determine a number of received data elements for the portions, and establish a desired number of data elements for the portions through the application of at least one multiplier to the number of received data elements for the portions. The evaluation module 140 may also be configured to communicate to the exchange computer system 100 the desired number of data elements from the contiguous set of data elements for the portions, the data elements communicated in the received order over the length of time. The evaluation module 140 may also be configured to evaluate performance of the transaction processing system during or after the communication of the data elements.

The trading and communication network environment shown in FIG. 1A includes exemplary computer devices 114, 116, 118, 120, 122, which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for providing electronic messages to the exchange computer system 100 and/or receiving market data or other messages from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

As shown in FIG. 1A, the Exchange computer system 100 may further include a message management module which may implement the disclosed mechanisms for managing electronic messages (e.g. electronically submitted trades and/or other market data) sent between an exchange and/or a plurality of communication system participants or between the system evaluation module 140 and the exchange. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc. As such, the evaluation module 140 may inject, provide, and/or otherwise communicate the data elements and/or transactions using any technique so as to mimic or otherwise resemble the provision of such data in a production environment.

Figure 1B:
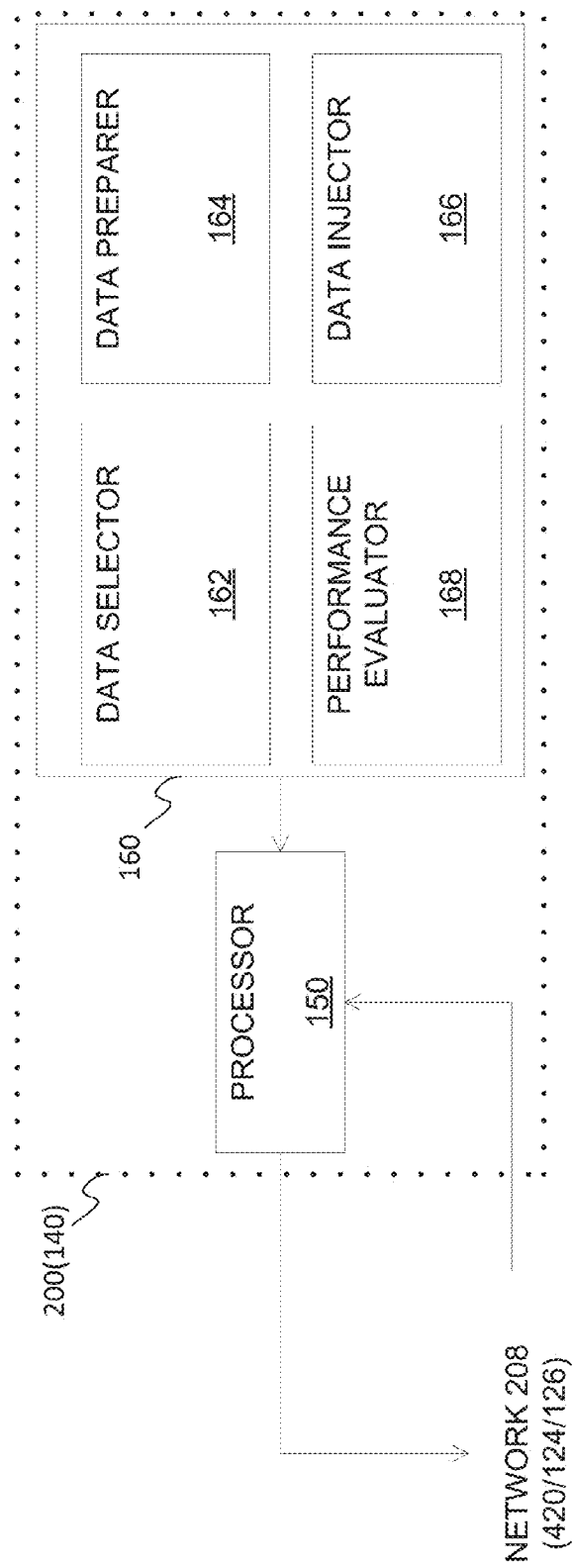

FIG. 1B depicts a block diagram of an evaluation module 140 according to one embodiment, which in an exemplary implementation, is implemented as part of the exchange computer system 100 described above.

FIG. 1B shows a system 200 for evaluating the performance of a transaction processing system. The system 200 may communicate with the transaction processing system via a network 208, which may be the network 420 described below or network 124 or 126 described above. The system 200 may be implemented as an evaluation module 140 as described above. The system 200 may involve functionality to identify, accumulate, organize and/or otherwise manipulate electronic messages containing data elements that have previously been received and/or processed by the transaction processing system. The system 200 may involve functionality to supply, inject, and/or otherwise communicate the electronic messages to the transaction processing system in a manner that mimics or mirrors the provision of electronic messages from traders using any of the previously described workstations and/or interfaces 116, 118, 122, 120, 114. As such, the transaction processing system may accept and/or otherwise receive the electronic messages from the system 200, and process them similar to any other production electronic messages. This will mimic the actual operation of the transaction processing system, but with controlled and/or accelerated load levels. It will be appreciated that the disclosed embodiments may be applicable to other types of electronic message, data elements, and transaction processing systems, beyond those described specifically with respect to the electronic exchange system 100 or other electronic trading systems. Further, the datasets, and/or the data elements contained therein, may be communicated throughout the system using one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the dataset communication format and/or protocols.

The system 200 includes a processor 150 and a memory 160 coupled therewith which may be implemented as processor 402 and memory 404 as described below with respect to FIG. 4. The system 200 may be a performance evaluation module 140, as described above with respect to FIG. 1A. The system 200 further may include a dataset store configured to store one or more datasets involving a collection of data elements received and/or processed by a transaction processing system. The data elements are organized in an ordered or standardized manner, such as including data indicating the order and/or sequence in which the data elements were received by the transaction processing system. As shown, the system 200 includes various logical functions, individual devices, and/or combined devices. The logical functions, individual devices, and/or combined devices may share the processor 150 as shown, or may include individual processors, as well as any combination or shared processing abilities over multiple processors. As such, multiple processors 150 may be used in dedicated applications for the particular individual devices, and/or combined devices, or in any shared combination.

The system 200 may include a data selector 162 that is stored in the memory 160 and executable by the processor 150 to identify a contiguous set of data elements previously processed by a transaction processing system. The set of data elements were previously received by the transaction processing system in an order or sequence.

The system 200 may include a data preparer 164 that is stored in the memory 160 and executable by the processor 150 to section a subset of the set of data elements into portions, sections, and/or segments. The subset was received by the transaction processing system over a length of time. The data preparer 164 may also be executable by the processor 150 to determine a number of received data elements for the portion, sections, and/or segments. The data preparer 162 may also be executable by the processor 150 to establish a desired number of data elements for the portions through the application of at least one multiplier to the number of received data elements for the portions.

The system 200 may include a data injector 166 that is stored in the memory 160 and executable by the processor 150 to communicate to the transaction processing system the desired number of data elements from the contiguous set of data elements for the portions. The data elements may be communicated in the received order over the length of time. Variations in the order may be provided through omissions or inclusions of data elements, though higher levels of order integrity may provide for improved mirroring the processing of actual production data.

The system 200 may include a performance evaluator 168 that is stored in the memory 160 and executable by the processor 150 to evaluate performance of the transaction processing system during or after the communication of the desired number of data elements. The evaluation may be performed using various techniques. For example, error reports, processing rate, and/or other measures may be used.

Figure 2:
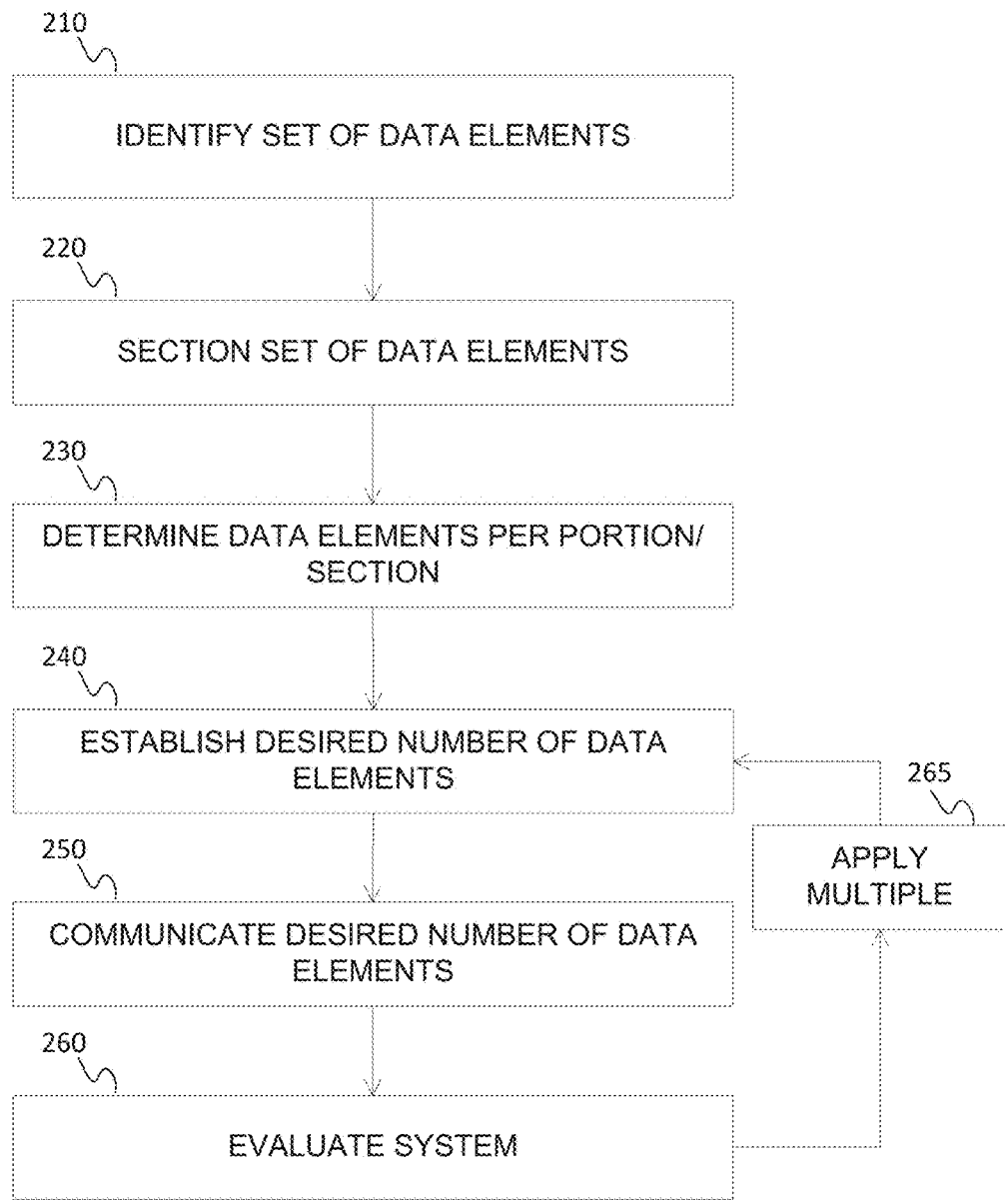
FIG. 2 depicts a block diagram of transaction processing system evaluation.

FIG. 2 depicts a flow chart showing operation of the performance evaluation module 140 of FIG. 1. In particular FIG. 2 shows a computer implemented method for evaluating performance of a transaction processing system. The operation includes identifying a set of data elements (Block 210), sectioning the set of data elements (Block 220), determining a number of data elements per portion or section (Block 230), establishing a desired number of data elements (Block 240), communicating the desired number of data elements (Block 250), and evaluating the transaction processing system (Block 260). Additional, different, or fewer indicated acts may be provided. For example, sectioning the data elements (Block 220) may not be included. The indicated acts may be performed in the order shown or other orders. The indicated acts may also be repeated, for example, establishing a desired number of data elements (Block 240), communicating the desired number of data elements (Block 250), and evaluating the system (Block 260) may be repeated.

The data elements may be identified (Block 210) using any technique. In an embodiment, the data elements may be identified as a group of sequential data elements that includes the largest number of data elements received over a particular period of time. For example, the data elements may include a period of production time for the transaction processing period wherein the reception, transaction, and/or processing rate for the data elements is the largest. Further, the data elements may be identified as date elements recently received by the transaction processing system. For example, the data elements may have been received within an immediately prior production period, such as the last week or seven (7) days, for the transaction processing system. Also, the set of data elements may be identified and include a large number of data elements. For example, the data set may include 50 million data elements.

Data elements of a dataset may involve any data, such as a volume, price, and/or other terms for a product, data indicating an order of receipt, as well as other information related to transactions to be conducted by the transaction processing system. The data elements were received by the transaction processing system as electronic messages containing the data.

The set of data elements may be sectioned using any technique (Block 220). For example, a subset of the set may be sectioned. The subset may include a smaller number of data elements than the set. For example, the subset may include data elements received by the transaction processing system over a specific period or length of time, such as ten (10) minutes. Further, the subset of the set of data elements may contain a largest number or maximum density (i.e. number of data elements per unit of time) of received data elements of the set. In an embodiment, the maximum density may indicate a peak or maximum processing rate and/or reception of data elements throughout the set.

The set of data elements may be sectioned (Block 220) into portions, sections, and/or segments. The portions, sections, and/or segments may be determined based on time of reception by the transaction processing system of the data elements, or on numbers of data elements. For example, the portions, sections, and/or segments may be determined Further, the portions, sections, and/or segments may be equal or similarly sized, or the portions, sections, and/or segments may include various sizes, selected to appropriately describe patterns of the data subset. Also, the subset may be a contiguous subset of data elements that were received over a length of time.

The number of received data elements for the portions may be determined using any technique (Block 230). In an embodiment, the number of data elements of the portions, sections, and/or segments may be counted or otherwise indexed, and this number may be used as the number of elements for the portions, sections, and/or segments. In an embodiment each of the portions, sections, and/or segments has number of received elements determined. Other measures for the number may be determined as well. For example, an average rate of received data elements per unit of time over the portions, sections, and/or segments may be established.

The desired number of data elements may be established using any technique (Block 240). The desired number of data elements for the portions, sections, and/or segments may be determined through the application of at least one multiplier to the number of received data elements for the portions, sections, and/or segments. A same or common, multiplier may be used across the portions, or different multipliers may be used across the portions. Further, a single multiplier, or multiple multipliers, may be applied to some portions, while no multiplier may be applied to other portions.

In an embodiment, the application of a multiplier to the values of the portions may provide that the production data elements identified will have a desired number that will mimic the average number of the high-water mark of the transaction processing system's history. Further multipliers or increments may also be added (Block 265). For example, double and triple multipliers may be applied to the desired numbers to provide for evaluation at accelerated increments of the high-water mark to allow for ultimate capacity testing of the transaction processing system. The transaction processing system may then be evaluated multiple times with various levels of loading to establish the performance of the transaction processing system. Evaluating at multiple levels and/or amplitudes of data element loading may provide the ability to evaluate and find further weaknesses in the system, and/or verify a performance for an expected loading.

In an embodiment, the at least one multiplier is configured to achieve an established average number of received data elements over the length of time. For example, the average may be established as a historical value for a high-water mark of system operation.

In an embodiment, a portion having the largest number of received data elements may be selected, and the at least one multiplier may be configured such that the desired number of data elements for this particular portion achieves a pre-determined number of data elements. For example, a historical peak, or peak rate, of data elements received may be identified through the history of the transaction processing system and the multiplier for the portion having the largest number in the subset may be configured to produce a desired number for the portion to the historical peak. As is indicated above, increments and/or multiples of the peak value may also be used to determine the multiplier. The multiplier for the particular portion may be different than the multipliers used for the other portions of the subset.

The desired number of data elements may be communicated in any manner, or using any technique, that mimics, simulates, and/or otherwise resembles the original reception of the production data elements (Block 250). For example, the data elements may be provided as electronic messages communicated to the transaction processing system through TCP/IP configured protocols. Alternatively, the data elements may be communicated directly, using electronic messages or other forms, using the transaction processing system bus, such as the communication bus 408 described below with respect to FIG. 4. Further, the data elements may be maintained and/or manipulated into in a queue, and have the release of the data elements controlled to allow for desired number reception of the data elements at the transaction processing system.

The performance of the transaction system may be evaluated and/or measured using any technique (Block 260). For example, the presence of errors or error messages generated by the transaction processing system during and/or after the communication of the data elements may be detected for evaluation. Further, a count of errors generated may be compared to an acceptable error number threshold to determine whether a particular evaluation is acceptable. Measures of performance may also be used, such as percentage maximum computing capacity or resources used or processing rate may be used to evaluation the performance of the transaction processing system. A time to complete processing of singular or groups of data elements may also be used.

Figure 3:
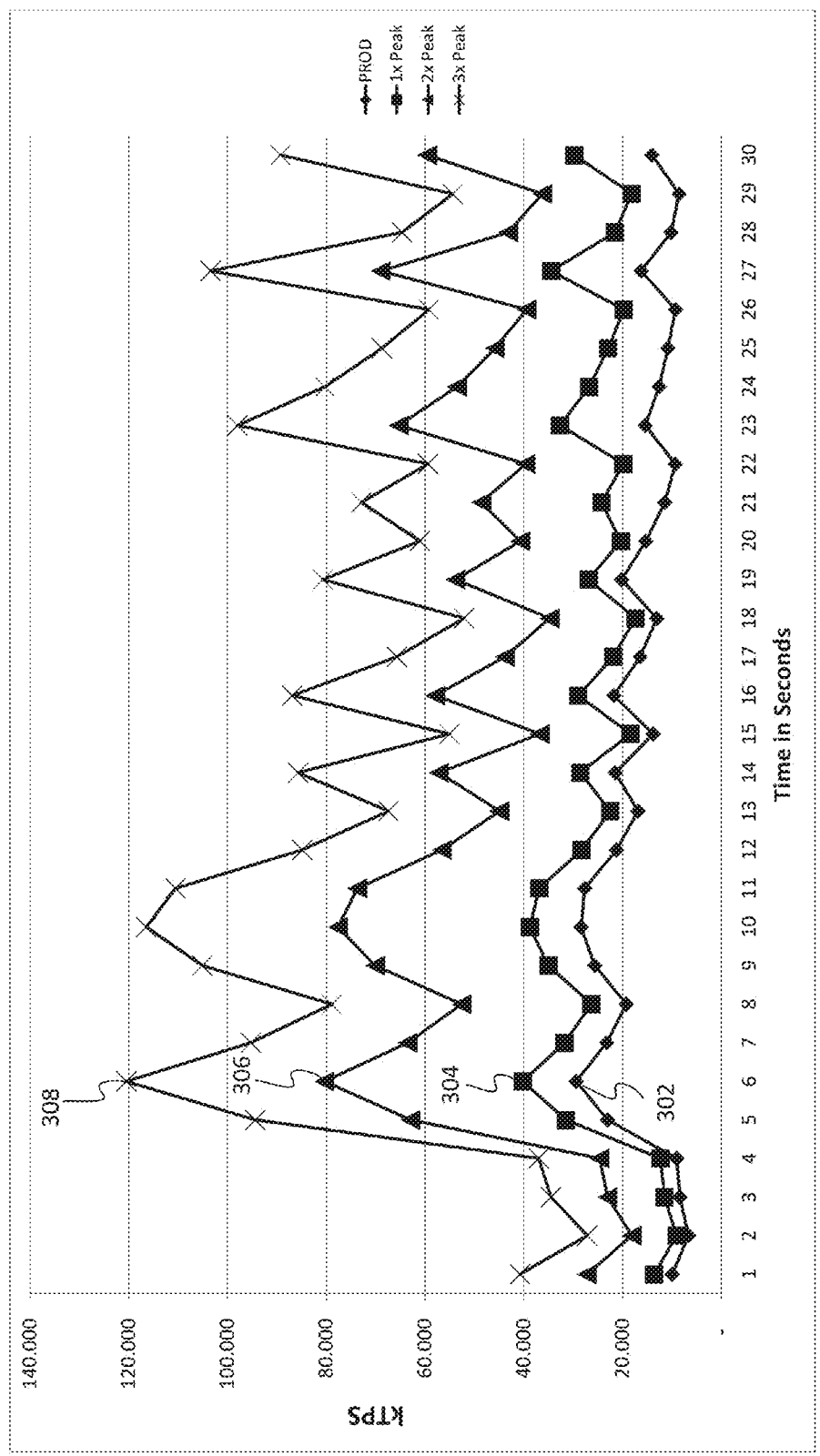
FIG. 3 illustrates data element number volumes and patterns for evaluation.

FIG. 3 illustrates various determined and desired data element numbers for an embodiment of transaction processing system evaluation. In this embodiment, the rate of transaction received is provided as the Y-axis value, time (measured in seconds) is provided as the X-axis value, with the segments being broken down, for example, into ten (10) second portions. As such, in this embodiment, a raw number of data elements and a rate of data elements will be the same (i.e. as transaction or data elements per second "TPS"). The production data elements over a subset 302 will have a pattern or shape defined by the amplitude of the number of data elements indicated for each of the time portions. This pattern is maintained as a multiplier is applied to the production data element numbers to increase the number of data elements of each portion for evaluation. The application of the multiplier, or multipliers, results in a base evaluation data set 304. Other data sets may also be generated that maintain the production pattern, but are incremented by multiples of the base evaluation set numbers for the portions. The base evaluation data set 304 and the multiple incremented datasets 306, 308 may be communicated to the transaction processing system for evaluation.

In an embodiment, the data used for the base 304 and incremented datasets 306, 308 is pulled from the same dataset as the production data elements 302. As larger numbers of data elements are needed to communicate to the transaction processing system, more data elements from the production dataset are added to the evaluation data sets 304, 306, 308. As can be derived from FIG. 3, for the production data elements 302 over the 30 second length of time 488,000 data elements are used. For the base 304 evaluation dataset 750,000 data elements are used. As such, the first 488,000 data elements will be the same as the production dataset, but the additional required data elements will be extracted sequentially from a larger set of the production data. Thus, the data elements will maintain the order and context with which they were received at the transaction processing system, but communicated at a more accelerated rate. For example, a data element that was received by the transaction processing system in the 7 second portion originally with the production data elements 302, may be communicated in the 6 second portion with the base evaluation dataset 304 as the data elements are arranged into the portions to accommodate the increased numbers per portion of the evaluation datasets 304, 306, 308. Through this accommodation, however, the original production order of the data elements is maintained.

In an embodiment, a set of data elements may be extracted from a collection of production data elements. Then a number of transactions, or received data elements, per second ("TPS") can be mapped across all the production data elements. Checkpoints may be generated at a set interval of data elements (e.g. 1 million data elements) or time (e.g. 60 seconds) throughout the set of data elements. These checkpoints may be used to define portions of the set of data elements. Then an average number of transactions, or received data elements, per second ("TPS") can be mapped for each portion across all of the portions. For an evaluation, Y may represent time (e.g. seconds) and Z may represent a number of data elements, thus, to match the peak amplitudes of the extracted dataset, and yet amplify the number of received data elements to a desired number of data elements, calculate the peak average TPS as Z/Y. Multipliers ("M") may then be determined for the portions. If the peak average TPS is less than the portion's average TPS, M will be less than 1. When M is less than 1, locate the peak portion having data elements with the highest M and subtract from it (1−M)/CurrentM*MaxM (or spread this adjustment proportionate across all of the other multipliers), then set this current M as 1, then derive other values for M of the other portions therefrom. Then, using the extracted supply of production data elements, provide portions with desired numbers, such as the new data element reception rates (TPS) determined as the production TPS number times the determined M, thus organizing the data elements into the portions proportional to the M amplified production pattern. Further, relative timing between specific sequential data elements within each second inside the portion may be determined using different techniques. In an embodiment, the production pattern may be maintained, as described above, with variable times between sequential elements. This may be accomplished while maintaining the production reception order by dividing the time difference between each adjacent record within the current second by the time difference between the original time stamp for the last data element in the current second and the last injected data element in the previous second. In another embodiment, the time differences are fixed between the data elements to maintain the desired numbers (e.g. rate). Ultimately, a particular evaluation is completed when the determined time period for the evaluation has lapsed. Subsequent evaluations of 2× and/or 3× multiples may be performed.

In an embodiment, a desired peak transaction rate is used. For example, 55,000 TPS may be a desired peak transaction rate of a base evaluation dataset. As such, a 3× evaluation may reach 165,000 TPS. Calculate the multiplier for each portion as stated above. Then, the portion having the maximum TPS ("maxTPS") of the production data may be determined. A new multiplier of M=55,000 TPS/maxTPS may be used for this portion to replace the calculated multiplier. The difference between the new multiplier and the calculated multiplier will be applied as a proportionate adjustment to another portion that has the highest multiplier, or spread it proportionately across all the other multipliers as stated above. In an embodiment, multiplier of M=55,000 TPS/maxTPS may be used for the entire production dataset to generate the base evaluation dataset. When a singular multiplier is used, sectioning and/or generating portions of the dataset may not be required.

Figure 4:
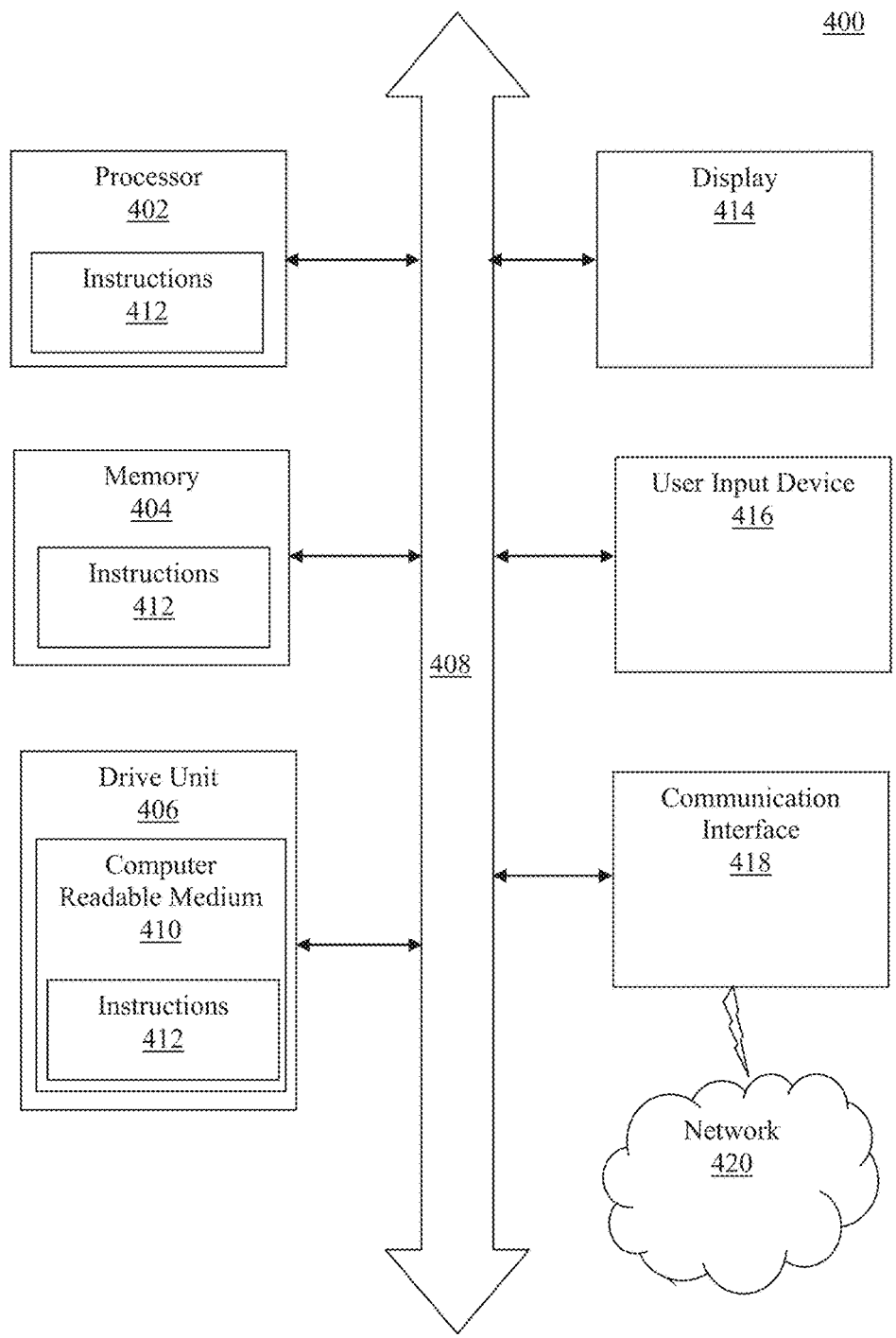
FIG. 4 shows an illustrative embodiment of a specialized computer system configured for transaction processing system evaluation.

Referring to FIG. 4, an illustrative embodiment of a specialized computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. In an embodiment, the computer system 400 involves a custom combination of discrete circuit components. The computer system 400 may implement embodiments for transaction processing system evaluation.

For example, the instructions 412 may be operable when executed by the processor 402 to cause the computer 400 to identify a contiguous set of data elements previously processed by the transaction processing system, the set of data elements having been received by the transaction processing system in an order. The instructions 412 may also be operable to cause the processor 402 to section a subset of the set of data elements into portions, the subset having been received by the transaction processing system over a length of time and determine a number of received data elements for the portions. The instructions 412 may also be operable when executed by the processor 402 to cause the computer 400 to establish a desired number of data elements for the portions through the application of at least one multiplier to the number of received data elements for the portions, communicate to the transaction processing system the desired number of data elements from the contiguous set of data elements for the portions, the data elements communicated in the received temporal order over the length of time, and evaluate performance of the transaction processing system during or after the communicating.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

In an embodiment, single or multiple processors may be provided. For example, in an embodiment, a system for releasing a controlled number of data elements having an order for transaction processing in a data transaction processing system in which data items are transacted by a hardware matching processor that matches electronic data transaction request messages for the same one of the data items based on multiple transaction parameters. The data elements having been originally received from different client computers over a data communication network. The system controls the release of data elements using an injection processor to meet specific characteristics that have been determined by a data preparation processor. The system may also include an evaluation processor that provides a determinative evaluation result of the release.

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400. In an embodiment, the input device 416 may facilitate a user in identifying a contiguous set of data elements previously processed by the transaction processing system. For example, the display 414 may provide a listing of evaluation results, status and/or errors of a transaction processing system. Further the input device 416 may allow for the selection of various multiples, or between determined multipliers, for evaluation datasets.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate cleansed datasets with user or trader devices.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a computer. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, the processors 211, 221, 231 shown in FIG. 2 may be implemented using an FPGA or an ASIC. For example, the receiving, augmenting, communicating, and/or presenting may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of evaluating performance of a transaction processing system, the method comprising:

identifying a pattern of transaction rates to be simulated over a length of time;

identifying a contiguous set of data elements previously processed by the transaction processing system, the set of data elements having been received by the transaction processing system in an order, the set of data elements including a greater number of data elements than the pattern;

sectioning, by a processor, a subset of the set of data elements into portions each corresponding to a transaction rate of the pattern;

determining, by the processor, a number of received data elements for the portions based on each transaction rate of the pattern;

establishing, by the processor, a number of data elements for the portions through the application of at least one multiplier to the number of received data elements for the portions;

generating, by the processor, the established number of data elements for a first portion by selectively moving data elements from a second portion of the contiguous set of data elements into the first portion, wherein the second portion is later in time than the first portion such that each portion of the sectioned subset of the set of data elements includes the established number of received data elements in the order in which they were received;

communicating, by the processor to the transaction processing system, the number of data elements from the contiguous set of data elements for the portions, the data elements communicated in the received order over the length of time; and evaluating, by the processor, performance of the transaction processing system during or after the communicating.

2. The method of claim 1, wherein the transaction processing system is an electronic trading system.

3. The method of claim 1, further comprising:
determining a multiplier for each of the portions, and wherein the at least one multiplier comprises a plurality of multipliers for the portions.

4. The method of claim 1, wherein the at least one multiplier is configured to achieve an established average number of received data elements over the length of time.

5. The method of claim 1, further comprising:
selecting a particular portion of the portions having the largest number of received data elements; and
wherein the at least one multiplier is configured such that the number of data elements for the particular portion achieves a pre-determined number of data elements.

6. The method of claim 1, wherein the communicating is repeated with at least one multiple of the number of data elements for the portions.

7. The method of claim 1, wherein the subset of the set of data elements contains a maximum density of received data elements from data elements received by the transaction system over the previous seven (7) days.

8. A system for evaluating performance of a transaction processing system, the system comprising:
a data selector configured to identify a pattern of transaction rates to be simulated over a length of time and a contiguous set of data elements previously processed by the transaction processing system, the set of data elements having been received by the transaction processing system in an order, the set of data elements including a greater number of data elements than the pattern;
a data preparer configured to section a subset of the set of data elements into portions each corresponding to a transaction rate of the pattern, determine a number of received data elements for the portions based on each transaction rate of the pattern, establish a number of data elements for the portions through the application of at least one multiplier to the number of received data elements for the portions;
the data preparer further configured generate the established number of data elements for a first portion by selective movement of data elements from a second portion of the contiguous set of data elements into the first portion, wherein the second portion is later in time than the first portion such that each portion of the sectioned subset of the set of data elements includes the established number of received data elements in the order in which they were received;
an injector configured to communicate to the transaction processing system the number of data elements from the contiguous set of data elements for the portions, the data elements communicated in the received order over the length of time; and
a performance evaluator configured to evaluate performance of the transaction processing system during or after the communication of the number of data elements.

9. The system of claim 8, wherein the transaction processing system is an electronic trading system.

10. The system of claim 8, wherein the data preparer is further configured to be executable by the processor to cause the processor to determine a multiplier for each of the portions, and wherein the at least one multiplier comprises a plurality of multipliers for the portions.

11. The system of claim 8, wherein the at least one multiplier is configured to achieve an established average number of received data elements over the length of time.

12. The system of claim 8, wherein the data preparer is further configured to be executable by the processor to cause the processor to select a particular portion of the portions having the largest number of received data elements; and
wherein the at least one multiplier is configured such that the number of data elements for the particular portion achieves a pre-determined number of data elements.

13. The system of claim 8, wherein the injector is configured to be executable by the processor to cause the processor to repeat the communication with at least one multiple of the number of data elements for the portions.

14. The system of claim 8, wherein the subset of the set of data elements contains a maximum density of received data elements from data elements received by the transaction system over an immediately previous number of days.

15. A computer system configured for evaluating performance of a transaction processing system, the system comprising:
a memory operable to store a contiguous set of data elements previously processed by the transaction processing system, the set of data elements having been received by the transaction processing system in an order; and
a computer processor, coupled with the memory, the computer processor configured to:
identify a pattern of transaction rates to be simulated over a length of time and a contiguous set of data elements, the set of data elements including a greater number of data elements than the pattern;
section a subset of the set of data elements into portions each corresponding to a transaction rate of the pattern;
determine a number of received data elements for the portions based on each transaction rate of the pattern;
establish a number of data elements for the portions through the application of at least one multiplier to the number of received data elements for the portions;
generate the established number of data elements for a first portion by selective movement of data elements from a second portion of the contiguous set of data elements into the first portion, wherein the second portion is later in time than the first portion such that each portion of the sectioned subset of the set of data elements includes the established number of received data elements in the order in which they were received;
inject into the transaction processing system the number of data elements from the contiguous set of data elements for the portions, the data elements communicated in the received order over the length of time; and
evaluate performance of the transaction processing system during or after the injection of the data elements.

16. The system of claim 15, wherein the processor is further configured to determine a multiplier for each of the portions, and wherein the at least one multiplier comprises a plurality of multipliers for the portions.

17. The system of claim 15, wherein the at least one multiplier is configured to achieve an established average rate of received data elements over the length of time.

18. The system of claim 15, wherein the processor is further configured to select a particular portion of the portions having the largest number of received data elements; and
wherein the at least one multiplier is configured such that the number of data elements for the particular portion achieves a pre-determined number of data elements.

19. The system of claim 15, wherein the processor is further configured to repeat the communication with at least one multiple of the number of data elements for the portions.

20. The system of claim 15, wherein the subset of the set of data elements contains a maximum density of received data elements from a collection of data elements previously received by the transaction system.

21. A non-transitory computer readable medium including instructions for evaluating performance of a transaction processing system, that when executed by a processor are operable to cause a computer system to:
identify a pattern of transaction rates to be simulated over a length of time and a contiguous set of data elements previously processed by the transaction processing system, the set of data elements having been received by the transaction processing system in an order, the set of data elements including a greater number of data elements than the pattern;
section a subset of the set of data elements into portions each corresponding to a transaction rate of the pattern;
determine a number of received data elements for the portions based on each transaction rate of the pattern;
establish a number of data elements for the portions through the application of at least one multiplier to the number of received data elements for the portions;
generate the established number of data elements for a first portion by selective movement of data elements from a second portion of the contiguous set of data elements into the first portion, wherein the second portion is later in time than the first portion such that each portion of the sectioned subset of the set of data elements includes the established number of received data elements in the order in which they were received;
communicate to the transaction processing system the number of data elements from the contiguous set of data elements for the portions, the data elements communicated in the received temporal order over the length of time; and
evaluate performance of the transaction processing system during or after the communicating.

* * * * *